No. 709,750. Patented Sept. 23, 1902.
A. DAILY & R. BAKER.
GRAPPLE.
(Application filed Apr. 25, 1902.)
(No Model.)
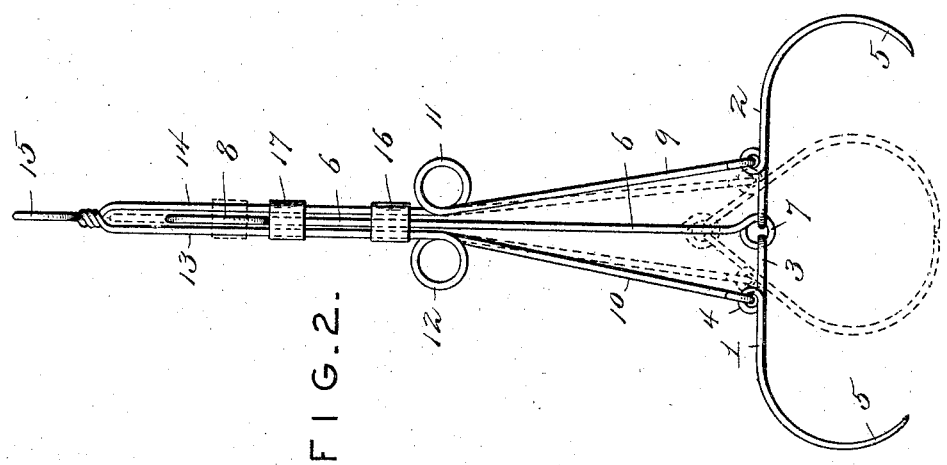
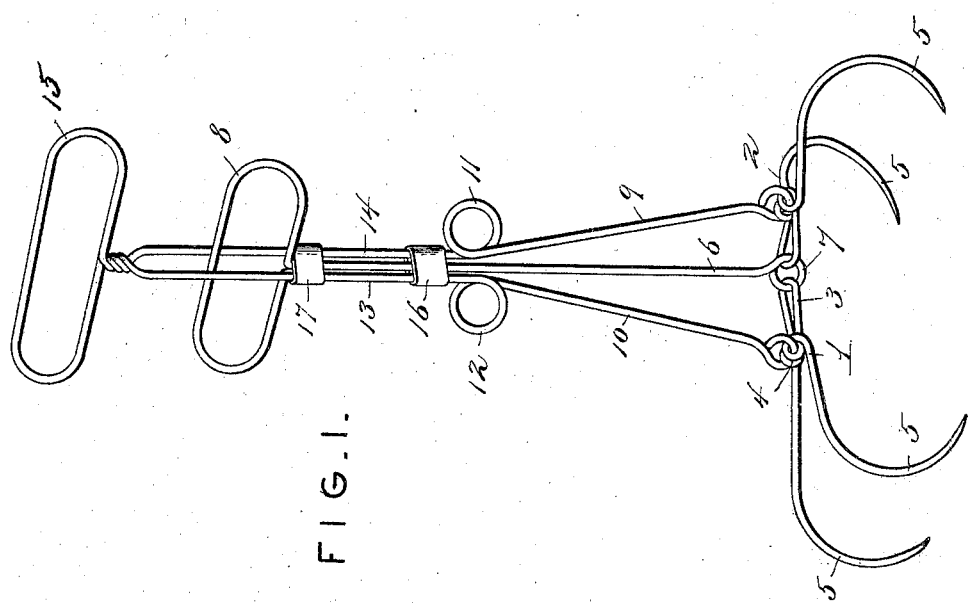
Witnesses
Harry L. Ames
B. F. Quick
Inventors
Arthur Daily
Riley Baker
By Victor J. Evans
Attorney
THE NORRIS PETERS CO., PHOTO-LITHO., WASHINGTON, D. C.

UNITED STATES PATENT OFFICE.

ARTHUR DAILY AND RILEY BAKER, OF OTISCO, INDIANA.

GRAPPLE.

SPECIFICATION forming part of Letters Patent No. 709,750, dated September 23, 1902.

Application filed April 25, 1902. Serial No. 104,628. (No model.)

*To all whom it may concern:*

Be it known that we, ARTHUR DAILY and RILEY BAKER, citizens of the United States, residing at Otisco, in the county of Clark and State of Indiana, have invented new and useful Improvements in Grapples, of which the following is a specification.

This invention relates to grapples; and one of the objects thereof is to provide a simple, durable, and efficient device of the character described which will effectually perform the services for which it is intended.

Other objects, as well as the novel details of construction, will be specifically described hereinafter, and the relative arrangement of the several parts will be clearly illustrated in the accompanying drawings, in which—

Figure 1 is a perspective view of the device, showing the jaws open. Fig. 2 is a side elevation of the same.

The reference-numerals 1 and 2 represent two oppositely-disposed jaws, each of which is formed by bending a wire intermediate its end to form a loop 3 and an eye 4 and then spreading the ends and curving them downwardly in the form of hooks to form claws 5. The jaws are connected together by means of a rod 6, which is formed at its lower extremity with an eye 7, connecting the loops 3, the upper extremity of the rod 6 being bent to form a transversely-elongated loop 8.

The jaws are normally held in a closed position, as shown in dotted lines, by means of two spring-arms 9 and 10, which engage the eyes 4 and which have the free ends of a strand bent intermediate its ends to form spring-coils 11 and 12 and having upwardly-projecting bars 13 and 14, running parallel with the rod 6, said bars 13 and 14 being spaced apart and are connected by a horizontally-elongated loop 15. Clips 16 and 17 are sleeved on the rods 13 and 14, encircling the same and also surrounding the rod 6, which is reciprocally secured within the same. It will be noticed that the loops 8 and 15 are on parallel planes, the loop 8 being spaced between the rods 13 and 14, whereby it may be moved back and forth toward and away from the loop 15, so as to open and close the jaws 1 and 2.
When it is desired to utilize the grapple, the loop 8 will be pressed down so that the bottom thereof will rest upon the sleeve 17. This will bring the loops 3 of the jaws 1 and 2 on a parallel plane, and the spring-arms 9 and 10, pressing inwardly toward each other, will tend to hold the jaws open. When the jaws are in proper position to grasp the article, the operator will force the two loops 8 and 15 together, thereby raising the loops 3 out of a horizontal plane, as shown in Fig. 2 in dotted lines, and the spring-arms 9 and 10 will tend to hold the jaws in a closed position until they are otherwise released.

It will thus be seen that we have provided a cheap, durable, and efficient device of the character described which will effectually perform the services for which it is intended.

We claim—

1. A grapple comprising a strand formed intermediate its ends with a loop, the free ends being run parallel to each other for a suitable distance and thence bent to form spring-coils, and finally terminating in spring-arms, jaws connected to the ends of the spring-arms, and a reciprocating rod connected to each of the jaws and adapted to be operated so as to open and close said jaws.

2. In a grapple, the combination with a pair of spring-actuated jaws, rods extending above the spring and connected at the top by a loop, said rods being spaced apart, a rod interposed between the first-named rods and connected to the jaws so as to operate them, and sleeved clips secured to the first-named rods and encircling the last-named rod, whereby it may be guided in a reciprocating relation to the device.

In testimony whereof we affix our signatures in presence of two witnesses.

ARTHUR DAILY.
RILEY BAKER.

Witnesses:
CATHERN BAKER,
ALLEN BAKER.